Oct. 17, 1933.   P. R. DRENNING   1,931,183
TRUCK SPRING
Filed Feb. 6, 1930
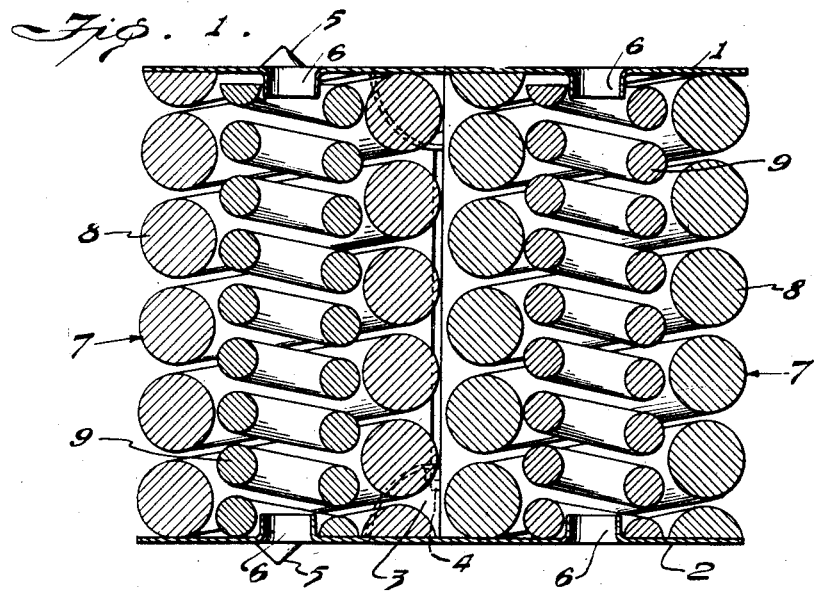
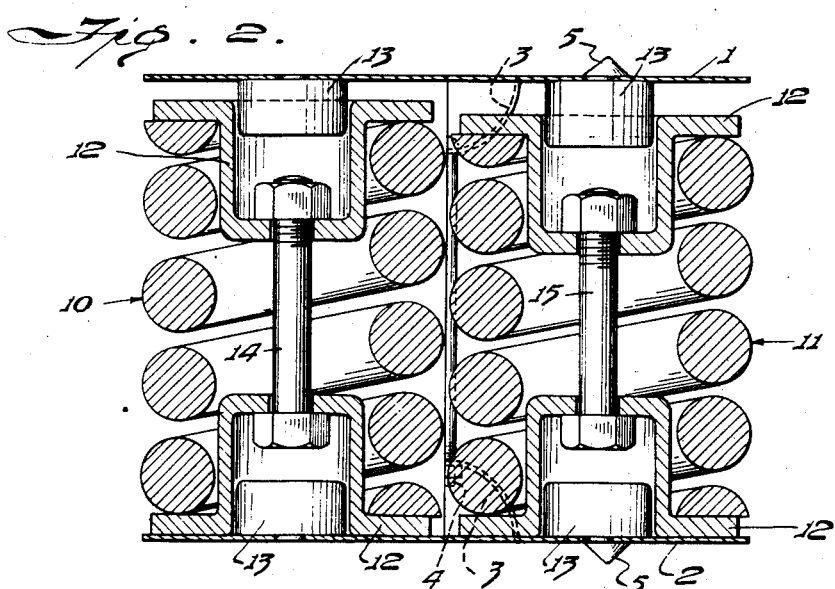
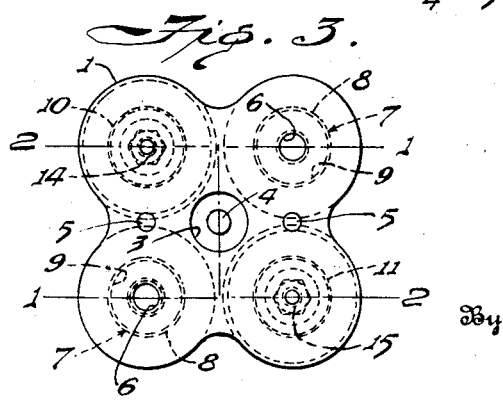
Inventor
Percy R. Drenning
By John Milton Jester
Attorney Patented Oct. 17, 1933

1,931,183

UNITED STATES PATENT OFFICE 1,931,183

TRUCK SPRING

Percy R. Drenning, Baltimore, Md., assignor to T. H. Symington & Son, Inc., Baltimore, Md., a corporation of Maryland Application February 6, 1930. Serial No. 426,385

6 Claims. (Cl. 267—4)

The invention relates to railway truck springs, particularly of the helical type arranged in groups or nests.

The principal object of the invention, generally stated, is to provide a truck spring group embodying a plurality of helical springs coordinated to give adequate support for all loads and possessing characteristics as to capacity, travel and periodicity to prevent synchronization of vibration and thereby break up any tendency of the assembly to jiggle.

It is well known that the present various standard types of truck springs consist of groups of helical springs, either single or double, arranged in symmetrical relation and having the same travel, free height and capacity. Owing to the large carrying capacity of modern freight cars it is apparent that the load upon and deflection of the truck springs varies through a wide range depending upon whether the car is empty, lightly loaded or fully and heavily loaded. Springs which will act properly under no load or light load conditions go solid under heavy load conditions and springs capable of operating efficiently under heavy load conditions have remarkably little cushioning effect under light load conditions. Furthermore as the ordinary springs are all of the same character, that is to say in so far as travel, free height, etc. are concerned, they all have the same period of vibration such as is brought about by passage of the car wheels over the track, it being known that when the natural period of vibration of the springs is synchronized with the passage of the wheels over low spots opposite each other in the two rails the vibration in the springs builds up and at certain speeds the expansive and compressive movement become so great that upon the recoil the truck bolster is frequently thrown clear off the springs.

The above problems have confronted railway engineers for several years and it is with the above facts in view that I have devised the present invention which has for its object the provision of a truck spring assembly or cluster comprising individual springs having a combined capacity sufficient to take care of the heaviest load but having different travels so that only certain of the springs will come into play under light or medium load conditions, the remainder serving to buff or snub a sudden downward thrust, thereby making it possible not only to give the proper cushioning effect regardless of the load but check jiggle and avoid the disadvantages above enumerated in connection with standard equipment.

Another object of the invention is to provide a truck spring cluster in which the units may be of the single or double coil type, the number of units depending upon the car capacity, one or more of the units or coils in the cluster being of less free and overall height than the others so as not to come into play until a certain load condition exists, the coil or coils of less free height having energy stored up in them which will break up the straight line curve of helical springs so that synchronization with the resultant disadvantage of jiggle will be prevented.

A further object of the invention is to provide a truck spring cluster composed of A. R. A., N. and W., or other types, having two or more standard double or single coil springs and one or more modified units which may comprise standard coils with means auxiliary thereto for bringing about the desired result.

A more specific object of the invention is to provide a truck spring cluster in which the modification of certain of the coils consists in an initial or preliminary compression thereof so that they will have a less free height than normal thereby enabling them to come into play successively as the load increases, these partially compressed springs acting to snub downward movement of the truck bolster.

Another object of the invention is to provide a spring assembly embodying a combination of ordinary single or double coil units and one or more modified units which may be either of the single or double coil type equipped for instance with bolt means for maintaining a certain preliminary compression, it being a feature that in the event that more than one modified unit is provided there would be a different degree of compression of the two.

Still another object of the invention is to provide a spring assembly embodying the specified characteristics but which may yet be used with the ordinary types of spring caps, though a modified construction of the latter may be resorted to if found advisable.

An additional object is to provide a structure of this character which will cost but little more than the ordinary or standard type and which may be installed with exactly the same facility and in the same manner while possessing the above mentioned features of superiority.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross sectional view taken through the spring assembly on the line 1—1 of Figure 3 and showing the standard springs in the cluster, Figure 2 is a similar view taken on the line 2—2 of Figure 3 and showing the modified units, and Figure 3 is a plan view of the nest.

Referring more particularly to the drawing, it may be said generally that I have devised a spring assembly or cluster including a plurality of either single or double coils arranged between lower and upper spring caps 1 and 2 of conventional design so that my assembly may be used as a replacement for the ordinary types of spring nests. As is well known, such spring caps are formed as steel stampings of general rectangular shape with rounded corners and having depressed central portions 3 so that they may be tied together by a retaining bolt 4. Furthermore such caps are formed with projections 5 adapted to enter within recesses in the underside of the truck bolster and in the spring plank or side frame to serve as retaining means. It is also customary to provide the caps with inwardly struck projections or flanges 6 entering within the spring nests for centering the same.

Broadly considered, my invention may comprise the employment of a plurality of springs all having the same standard capacity, if permitted to remain at their normal free height, but in which certain ones are held under an initial deflection or compression so as to break up the straight line spring curve and thereby be capable of acting as snubbers. More specifically considered, the invention may comprise the employment of a pair of units 7 preferably diagonally arranged in the nest and each consisting of standard outer and inner compression coils 8 and 9 respectively. The outer coils abut against the spring caps whereas, as is customary, the inner coils terminate slightly below the upper cap. However, there is no particular limitation in this respect as it is conceivable that these springs might be of the single instead of the double type or that both the outer and the inner might contact both spring caps. There is nothing whatsoever distinctive or unusual about these two units.

In carrying out the invention I make use of one or more modified units, two being shown in the present instance, alternating with the standard units, or in other words diagonally arranged in the nest. These two units are designated generally by the numerals 10 and 11 and it will be observed that they are of different heights owing to the fact that they are held under different degrees of compression. Each of these is shown as comprising a single coil though it should be understood that this is not essential as outer and inner coils could be used if preferred. Each of these snubbed springs is represented as equipped at its ends with its own individual spring caps 12 guidably receiving projections 13 on the spring caps 1 and 2, which projections are preferably of sufficient diameter and length to maintain these units in proper position. These springs are held under compression as by bolts 14 and 15. To prevent the units from shaking or rattling around in the nest the lower caps 12 may be secured to the bottom spring cap in any desired manner as for example by spot welding. When the equipment is used on a car of a type which is operated either fully loaded or empty, there is no necessity for two snubbed springs of different heights, but in other cases, for example box cars where there may be a wide variation in the load it is clearly preferable to utilize two of the modified springs so that there will be different steps in the snubbing action, the standard springs supporting the ordinary light loads with the modified springs coming successively into play as the load progressively increases.

While definite figures are not necessary to a proper understanding of the invention, it might be mentioned, by way of illustration, that the spring in the unit 10 may be compressed, by means of the tie bolt, $\tfrac{5}{16}$ of an inch and therefore maintained under an initial compression of approximately 5,000 pounds while the spring in the unit 11 may be compressed ⅝ of an inch and be maintained under an initial compression of 10,000 pounds. In the operation, it is of course apparent that under light load conditions the cushioning effect is afforded by the standard units 7 and 8. As the load increases and the standard units are deflected and vibrate or jiggle, as they invariably will, the bolster, or rather the spring cap beneath it, will strike against the individual cap on the upper end of the spring unit 10 and as this unit has considerable stored energy there will be a distinct and abrupt snubbing action which will effectually break up the jiggle of the standard springs even under the most adverse conditions such for example as when this vibration becomes synchronized with passage of the car wheels over low spots. The two standard units, together with the one modified or compressed unit, will take care of intermediate loads. Under the heaviest load conditions the last remaining or modified spring will come into play after the others have been deflected to a certain predetermined extent and will in turn exert its snubbing action so that the usual vertical jiggle will be reduced to the minimum. While certain figures are given above, it should be understood that there may be variations in this respect depending upon whether the nest have four, five, six or more units therein, this depending upon the character of the car, that is to say its lading capacity, it being obvious that different conditions are met with in forty ton cars, for example, than exist in connection with those of the seventy ton type. It will be understood that I reserve the right to make all such changes in the capacity of the individual springs, the number of those modified and the extent of preliminary compression, as will not depart from the spirit of the invention or the scope of the claims hereunto appended.

Having thus described the invention, I claim:

1. A spring assembly comprising a plurality of helical springs of standard height and capacity confined between upper and lower caps, and a unit with individual caps held under initial compression and having its free height reduced as compared with the free height of the standard units and adapted to come into play upon deflection of the standard units beyond a predetermined extent.

2. In a spring assembly, a plurality of helical springs, certain of which are held under varying degrees of compression with the free heights thereof progressively decreasing.

3. In a spring assembly, a plurality of helical spring units of standard capacity and height, and a plurality of other units subjected to and maintained under progressively varying degrees of compression and having their free height correspondingly decreased.

4. A spring assembly comprising spring caps, a plurality of standard helical spring units disposed therebetween in contacting relation thereto, a plurality of other units held under initial compression and equipped with individual caps adapted to engage the first named caps.

5. In a spring assembly, upper and lower spring caps, a plurality of standard helical springs disposed therebetween, and a plurality of modified units each including a helical spring equipped at its ends with individual caps adapted to cooperate with the first named caps upon deflection of the first named springs beyond a predetermined extent, and tie bolts passing through the respective second named caps for maintaining the modified units under a predetermined initial compression with a reduced free height.

6. A railway truck spring assembly comprising upper and lower caps, a plurality of helical springs interposed between and engaging against said caps and arranged side by side, a plurality of other helical springs disposed in side by side relation between the caps, individual caps fitting within the second named helical springs and having cup portions extending toward each other, projections on said first named caps entering said cup members, and tie bolts connecting the confronting ones of said cup members for maintaining the second named springs under initial compression.

PERCY R. DRENNING.